Feb. 14, 1956 W. SCHMID 2,734,666
CONTROL VALVE FOR LUBRICATING APPARATUS
Filed Nov. 4, 1950
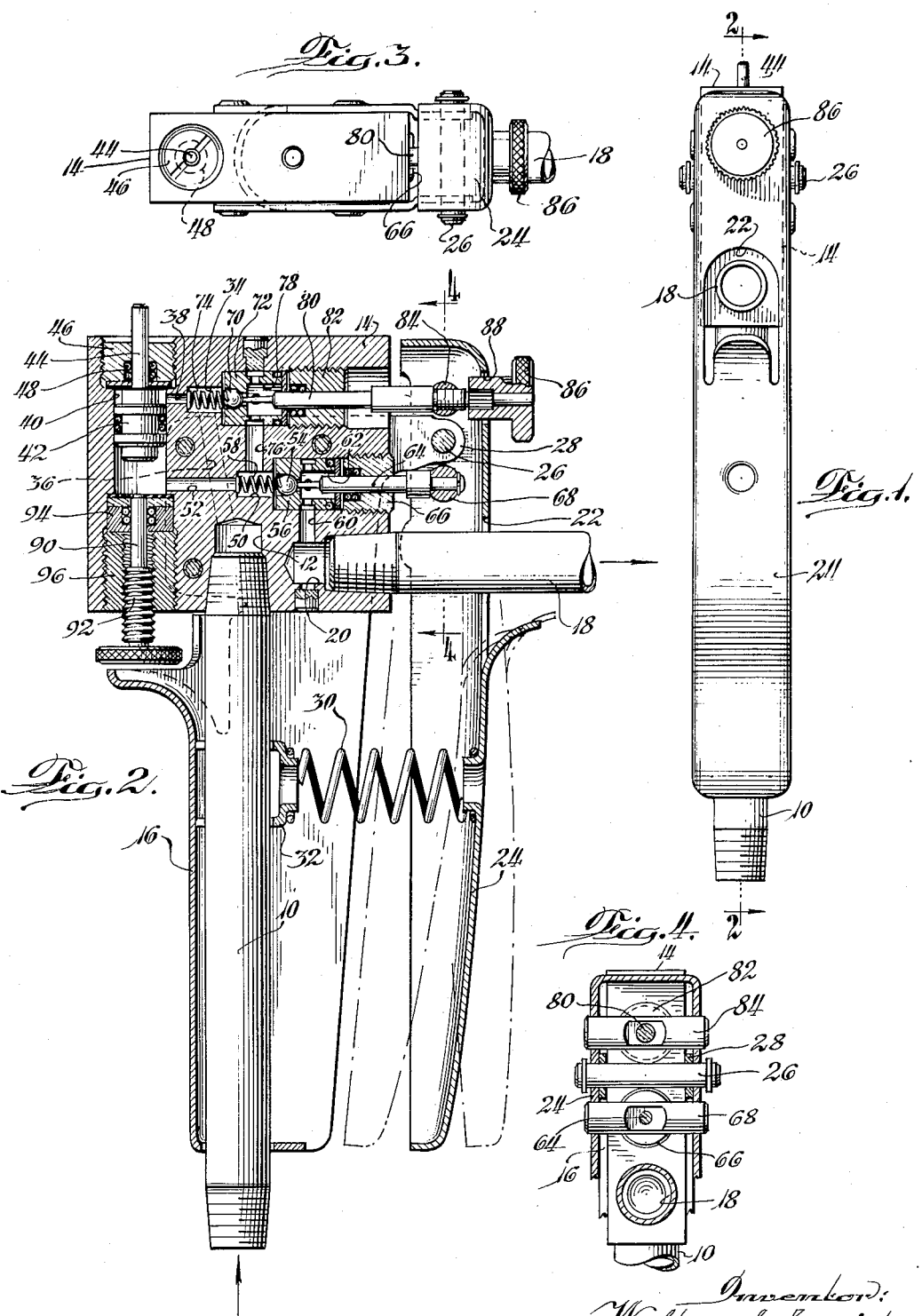
Inventor:
Walter Schmid
By Hinkle, Horton, Ahlberg & Hupper
Attorneys.

United States Patent Office 2,734,666
Patented Feb. 14, 1956

2,734,666

CONTROL VALVE FOR LUBRICATING APPARATUS

Walter Schmid, Chicago, Ill., assignor to Stewart-Warner Corporation, Chicago, Ill., a corporation of Virginia Application November 4, 1950, Serial No. 194,118

8 Claims. (Cl. 222—250)

This invention relates to a control valve which is particularly useful in connection with lubricating apparatus.

An object of the invention is to provide an improved control valve for supplying a single measured charge or shot of lubricant in response to each operation of the valve.

A further object is to provide such a control valve which is adjustable for selectively supplying a continuous flow of lubricant rather than a measured charge.

A further object is to provide such a control valve which achieves a high degree of accuracy of charge measurement with a simple and economical construction.

A still further object of the invention is to provide such a control valve having convenient and positively acting means for adjusting the valve for either measured or continuous flow.

Other objects, advantages and features of the invention will be apparent from the following description of an illustrative embodiment of the invention, taken with reference to the drawing, in which:

Fig. 1 is a front elevational view of an illustrative control valve;

Fig. 2 is a side elevational sectional view taken on the line 2—2 of Fig. 1;

Fig. 3 is a top view; and

Fig. 4 is a fragmentary front sectional view taken on the line 4—4 of Fig. 2.

The illustrative control valve has an inlet pipe 10 which may be continuously supplied with lubricant under pressure by means of a hose, not shown, connected with a lubricant pressure source. The inlet pipe is threaded into an opening 12 in a body block 14 which houses most of the working parts of the valve. A handle or grip 16, which is secured to the body 12, partly encloses the inlet pipe 10.

An outlet conduit 18, threaded into an opening 20 in the lower portion of the front of the valve body 14, may be connected with a device which is to be lubricated by means of a coupler, not shown. The outlet conduit 18 passes through an opening 22 in an operating lever 24 which is rotatably connected by means of a pivot 26 with an ear 28 protruding from the front of the valve body. A coil spring 30, compressed between the operating lever 24 and a spring retaining pillar 32 mounted on the handle 16, urges the lower end of the operating lever 24 forwardly in a counterclockwise direction.

The opening 12, which receives the inlet pipe 10, is connected with a horizontal bore 34 by means of an inclined passage 36. The bore 34 connects through a passage 38 with the upper end of a vertical measuring piston cylinder 40 in which a measuring piston 42 is slidably positioned. The piston is suitably packed to prevent leakage of lubricant between the piston and the piston cylinder. The piston has a stem 44 which extends upwardly through a plug 46 into the atmosphere. Suitable packing 48, positioned between the plug and the stem, prevents leakage of lubricant.

The lower end of the measuring piston cylinder 40 is connected with a horizontal bore 50 by a passage 52. Communication between the bore 50 and the opening 20, which receives the outlet, is controlled by a check valve including a valve ball 54. The ball 54 is pressed forwardly toward a valve seat bushing 56 by a compression spring 58 positioned in the bore 50. A passage 60 connects the outlet opening 20 with an axial bore 62 in the valve seat bushing in front of the ball 54.

A plunger 64 extends through a suitably packed opening in a plug 66 positioned just in front of the valve seat bushing 56. The rear end of the plunger 64 is engageable with the ball 54 and the front end of the plunger is secured to the operating lever 24 by means of a pivot 68 positioned below the pivot 26.

Communication between the bore 58 and the bore 34 is controlled by means of a check valve including a ball 70. The ball is urged forwardly toward a valve seat bushing 72 by a compression spring 74 positioned in the bore 34. A passage 76 in the valve body 14 connects the bore 58 with an axial bore 78 in the valve seat bushing 72 in front of the ball 70.

A plunger 80 extends through a suitably packed opening in a plug 82 positioned immediately in front of the valve seat bushing 72. The rear end of the plunger is engageable with the valve ball 70 and the front end is threaded through a pivot 84 rotatably mounted on the operating lever 24 above the pivot 26. A knob 86 is fixed to the plunger 80 in front of the pivot 84. The knob 86 and the front end of the plunger 80 pass through an opening 88 in the upper end of the operating lever 24.

Downward movement of the piston 42 may be limited by a stem 90 extending from the upper end of an adjusting screw 92 into the lower end of the piston cylinder 40. The stem passes through a suitably packed opening in a bushing 94 and the screw is threaded in a bushing 96 positioned immediately below the bushing 94.

When the control valve is to be operated, the inlet pipe 10 is continuously supplied with lubricant under pressure. Since communication between the opening 12, which receives the inlet pipe, and the upper end of the cylinder 40 is provided by the passage 36, the bore 34 and the passage 38, the pressure of the lubricant tends to force the measuring piston 42 downwardly. However, assuming the valve passages are filled with lubricant, downward movement of the piston is prevented by lubricant trapped in the lower end of the piston cylinder 40 which cannot escape since initially the check valve ball 54 engages its seat 56 to shut off communication with the outlet pipe 18.

In Fig. 2 the operating lever 24 is shown in an intermediate position and the extremes of movement of the lever are indicated by dotted line positions. When the operating lever 24 is moved inwardly against the force of the spring 30 to the intermediate position as shown, the lower plunger 64 engages the ball 54. When the operating lever is moved farther inwardly, the plunger 64 forces the check valve ball 54 away from its seat 56. When the check valve ball 54 is operated, the pressure of the lubricant in the lower end of the piston cylinder 40 is relieved and consequently, the lubricant under pressure from the inlet pipe 10 is forced into the upper end of the piston cylinder through passages 36, 34 and 38 thereby forcing the piston downwardly. In this manner, fresh lubricant is supplied to the upper end of the cylinder, while the lubricant in the lower end is being displaced from the lower end through the passage 52 and the bore 50 around the ball 54 into the bore 62 and thence through the passage 60 and the bore 20 into the outlet pipe 18. Lubricant flow to the outlet pipe continues until the piston 42 reaches the bottom of its stroke. The quantity of lubricant supplied depends upon the length of the stroke of the piston. The length may be adjusted by turning the screw 92 so that the downward movement of the piston is arrested by the stem 90.

When the operating lever 24 is released, the plunger 64 is moved forwardly to permit the check valve ball 54 to engage its seat 56. The ball 54 is urged against the seat 56 by lubricant pressure in the bore 50 and by the spring 58.

After the ball 54 is seated, the upper plunger 80 engages the front of the check valve ball 70 and forces it away from its seat 72. Lubricant then flows from the inlet pipe into the lower end of the piston cylinder 40 through the passage 36, the bore 34, the bore 78, the passage 76, the bore 50 and the passage 52. The measuring piston 42 is moved upwardly by the force of the lubricant in the lower end of the piston cylinder 40 because the area of the lower end of the piston exposed to lubricant is greater than the exposed area of the upper end of the piston, since the stem 44 extends from the upper end into the atmosphere. Thus the lower portion of the piston cylinder 40 is refilled with lubricant in preparation for the next operation of the valve.

When a continuous flow of lubricant is desired rather than a measured shot, the plunger 80 is screwed rearwardly through the pivot 84 by manually rotating the knob 86. At its extreme rearward adjustment the plunger 80 holds the check valve ball 70 off its seat 72 throughout the range of movement of the operating lever 24. When the operating lever 24 is moved inwardly to unseat the ball 54, lubricant flows around the balls 70 and 54 from the inlet pipe 10 to the outlet pipe 18 through the opening 12, the passage 36, the bore 34, the bore 78, the passage 76, the bore 50, the bore 62, the passage 60, and the opening 20. Flow of lubricant may be terminated by releasing the operating lever 24 to permit seating of the valve ball 54.

The valve is particularly rugged and economical. The change from single charge delivery to continuous flow is simply and positively accomplished. The provision of the differential measuring piston assures accurate charge measurement.

While I have shown and described a preferred embodiment of my invention, it will be apparent that numerous variations and modifications thereof may be made without departing from the underlying principles of the invention. I therefore desire, by the followitg claims, to include within the scope of the invention all such variations and modifications by which substantially the results of my invention may be obtained through the use of substantially the same or equivalent means.

I claim:

1. A control valve for delivering uniform measured charges of lubricant, comprising an inlet conduit, an outlet conduit, a measuring cylinder containing a piston, one end of the piston having a smaller area than the other, means forming a permanently open passage connecting the inlet conduit with one end of the measuring cylinder adjacent the smaller end of the piston, a normally closed outlet valve connected between the outlet conduit and the other end of the measuring cylinder independently of the passage, a normally closed recharging valve connected between the inlet conduit and said other end of the measuring cylinder independently of the passage, and means for opening the valves alternately independently of the passage.

2. A control valve for delivering uniform measured charges of lubricant, comprising an inlet conduit, an outlet conduit, a measuring cylinder containing a piston, one end of the piston having a smaller area than the other, means forming a permanently open passage permanently connecting the inlet conduit with the end of the measuring cylinder adjacent the smaller end of the piston, and means independent of the passage for connecting the other end of the measuring cylinder alternately with the outlet conduit and the inlet conduit.

3. A control valve for selectively delivering measured charges or a cotinuous flow of lubricant, comprising an outlet conduit, a measuring cylinder, an inlet conduit connected with one end of the measuring cylinder, a piston in the cylinder having a smaller end and a larger end, the smaller end facing the inlet conduit, a normally closed outlet valve connected between the outlet conduit and the opposite end of the measuring cylinder, a normally closed recharging valve connected between the inlet conduit and said opposite end of the measuring cylinder, a manually movable control member, means connecting the control member with the outlet valve to open the valve when the member is operated in a predetermined direction, and means connecting the control member with the recharging valve normally to open the recharging valve when the control member is operated in the opposite direction, the last mentioned means including means adjustable to hold the recharging valve open when the member is operated in the predetermined direction, to produce continuous flow.

4. A control valve for selectively delivering measured charges or a continuous flow of lubricant, comprising an outlet conduit, a measuring cylinder, an inlet conduit connected with one end of the measuring cylinder, a piston having a smaller end and a larger end, the smaller end facing the inlet conduit, a normally closed outlet valve connected between the outlet conduit and the opposite end of the measuring cylinder, a normally closed recharging valve connected between the inlet conduit and said opposite end, a manually movable control rocker mounted on a pivot, means connecting the outlet valve to the control rocker on one side of the pivot to open the valve when the rocker is operated in a predetermined direction, and means connecting the recharging valve with the rocker on the other side of the pivot normally to open the recharging valve when the rocker is operated in the opposite direction, said last mentioned means including means for adjusting the length of said means to hold the recharging valve open when the rocker is operated in a predetermined direction to produce continuous flow.

5. A control valve for selectively delivering measured charges or a continuous flow of lubricant, comprising an outlet conduit, a measuring cylinder, an inlet conduit connected with one end of the measuring cylinder, a piston having a smaller end and a larger end, the smaller end facing the inlet conduit, a normally closed outlet check valve connected between the opposite end of the measuring cylinder and the outlet conduit, a normally closed recharging check valve connected between the inlet conduit and said opposite end, a manually movable control rocker mounted on a pivot, a thrust member extending from the control rocker on one side of the pivot to the outlet valve to open the valve when the rocker is operated in a predetermined direction, resilient means urging the rocker in the opposite direction, a second thrust member extending from the rocker on the opposite side of the pivot normally to open the recharging valve when the rocker is released, and means for adjusting the length of the second thrust member to hold the recharging valve open when the rocker is operated, to produce continuous flow.

6. A control valve for selectively delivering measured charges or a continuous flow of lubricant, comprising an outlet conduit, means providing a measuring chamber, movable means in the measuring chamber dividing the latter into first and second compartments, the movable means having a smaller surface facing the first compartment and a larger surface facing the second compartment, an inlet conduit connected with the first compartment, a manually movable control member, valve means operable by the control member to connect the second compartment with the outlet conduit when the control member is moved in a predetermined direction and normally to connect the inlet conduit with the second compartment when the control member is operated in the opposite direction, and adjustable means for connecting the inlet conduit with the second compartment when the control member is operated in the predetermined direction, selectively to produce continuous flow.

7. A control valve for delivering pressure fluid in measured charges or a continuous flow, comprising, in combination, a measuring cylinder, means defining an inlet into one end of said cylinder, means defining an outlet from the other end of said cylinder, a piston slidably mounted within said cylinder, a normally closed outlet valve disposed in series with said outlet, means including a normally closed recharging valve for selectively connecting said inlet with said other end of said cylinder, control means for opening said valves in sequence for delivering fluid in measured charges, and adjustable means on said control means for maintaining said recharging valve in open position when said outlet valve is opened by the latter means to deliver fluid in a continuous flow.

8. A control valve for dispensing high pressure lubricant or the like, comprising, in combination, means for measuring discrete charges of lubricant, means defining a fluid inlet communicating with said measuring means, means defining a fluid outlet from said measuring means, first valve means interposed in said outlet, second valve means connected between said inlet and said outlet in series with said first valve means, control means for operating said first and second valve means in sequence for charging fluid into and discharging fluid from said measuring means, and means selectively operable for maintaining said second valve means open while said first valve means is opened to discharge fluid in a continuous flow.

References Cited in the file of this patent

UNITED STATES PATENTS

| | | |
|---|---|---|
| 1,191,663 | Candee | July 18, 1916 |
| 1,652,318 | Morton | Dec. 13, 1927 |
| 1,764,823 | Bowlers | June 17, 1930 |
| 1,933,905 | Hawks | Nov. 7, 1933 |
| 2,427,755 | Wedeberg | Sept. 23, 1947 |